Nov. 25, 1958 R. C. CURTIS 2,862,054

SELF-CORRECTING PULSE-CODE-COMMUNICATION SYSTEM

Filed March 30, 1953 4 Sheets-Sheet 1

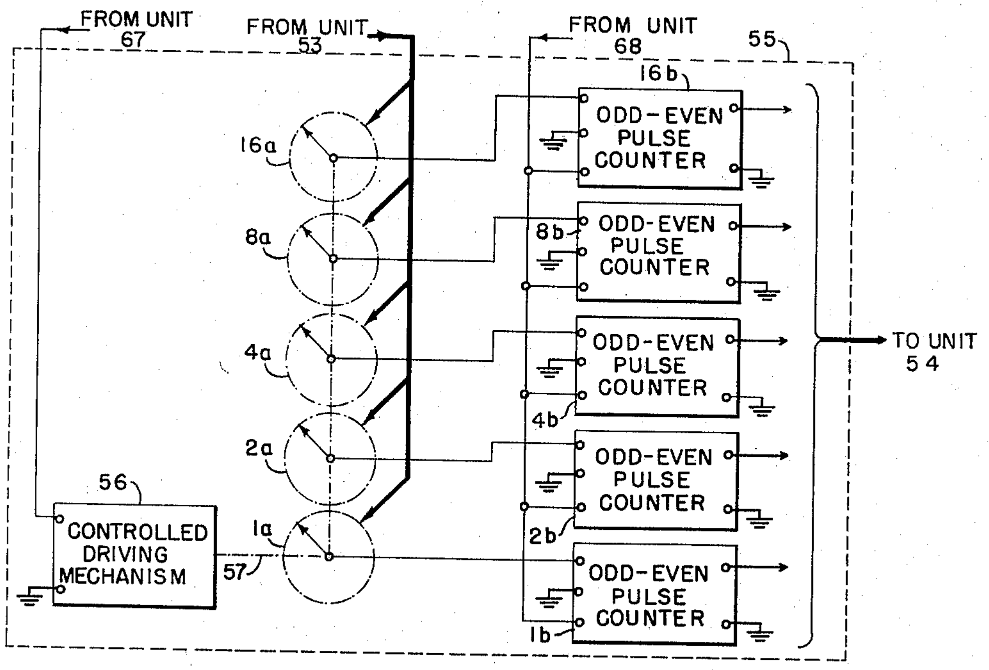
FIG. 2
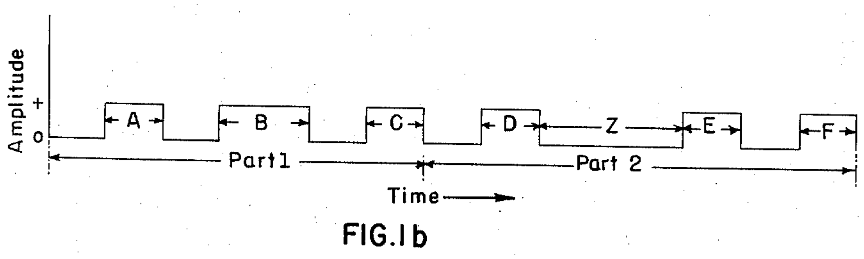
FIG. 1b
| | C | C | | C | | | | C | | | | | | | | C | | | | | | | | | | | | | | |
|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| 16→ | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 |
| 8→ | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 |
| 4→ | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 |
| 2→ | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 |
| 1→ | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 |
FIG. 3

SELF-CORRECTING PULSE-CODE-COMMUNICATION SYSTEM

Filed March 30, 1953 4 Sheets-Sheet 3

United States Patent Office 2,862,054

Patented Nov. 25, 1958

2,862,054

SELF-CORRECTING PULSE-CODE-COMMUNICATION SYSTEM

Richard C. Curtis, Old Westbury, N. Y., assignor to Hazeltine Research, Inc., Chicago, Ill., a corporation of Illinois Application March 30, 1953, Serial No. 345,563

7 Claims. (Cl. 178—23)

*General*

This invention relates to pulse-code-communication systems and, more particularly, to self-correcting pulse-code-communication systems. The invention is especially useful in connection with automatic-telegraph equipment and, accordingly, will be described in that environment.

One previously known type of automatic-telegraph equipment utilizes a manually operated automatic-telegraph sender which develops electrical binary-permutation-code message-pulse groups representative of discrete message symbols. In another type of automatic-telegraph equipment, message pulses are developed in the form of holes punched in a tape which may be utilized later with suitable tape-responsive equipment to develop electrical binary-permutation-code pulses representative of the punched holes and thus of the message symbols.

The electrical binary-permutation-code message pulses developed by either type of equipment may be applied as modulation information to a conventional radio-frequency transmitter for developing radio-frequency pulses in accordance therewith for transmission to suitable receiving equipment which responds to the transmitted pulses for reproducing the discrete message symbols. During the transmission of these pulses from the transmitter to the receiving equipment, noise disturbances, caused for example by atmospheric conditions, may distort the transmitted pulses by, for example, canceling a transmitted pulse or adding a pulse in a space between pulses. Such distortions of transmitted pulse groups cause error in the reproduction of the discrete message symbols represented by the pulse groups.

One type of automatic-telegraph equipment heretofore proposed utilizes a minimum of a 7½ digit code to represent each message symbol and corresponding synchronizing information. More particularly, 5 digits represent the message symbol and each group of 5 digits is preceded by a start-synchronizing digit and followed by a stop-synchronizing pulse of at least 1½ digits' duration. In such a system, it is possible to transmit a maximum of $2^5$ or 32 message-digit pulse permutations individually to represent discrete message symbols. By "message symbols" is meant, for example, letters of the alphabet, numbers, and miscellaneous control symbols for operating the printer of the receiving equipment. A typical digital element duration for such a system is about 22 milliseconds and a normal maximum operating speed is about 60 5-letter words per minute.

It has been found that a high percentage of the errors occurring in automatic-telegraph equipment of the type just described occurs as the result of not more than one error every 37½ digits. In other words, this error rate, which may be considered as a maximum rate, corresponds to a rate of one error for every 5 message symbols or letters. If the symbols are transmitted in 5-letter groups, as in privacy or secrecy communication systems, the maximum error rate corresponds to one error each 5-letter group or word. Accordingly, by correcting errors in each 5-letter group whenever the error is the result of distortion of one of the 25 message digits representative of letters of that group, a high percentage of the errors in the reproduction of message symbols is eliminated.

It is an object of the present invention, therefore, to provide a new and improved self-correcting pulse-code-communication system for translating a signal representing message-code pulses representative of discrete message symbols and for reproducing the symbols subject to reduced error.

It is another object of the invention to provide a new and improved pulse-code-transmitting system for transmitting a signal representing message-code pulses representative of discrete message symbols and check-code pulses for checking the signal for signal-translation error.

It is another object of the invention to provide a new and improved error-correcting pulse-code-receiving system for receiving a signal representing message-code pulses representative of discrete message symbols and check-code pulses for checking the signal for signal-translation error and for reproducing the symbols subject to reduced error.

It is another object of the invention to provide a new and improved self-correcting pulse-code-communication system for translating a signal representing binary-permutation-code pulses representative of discrete message symbols and binary-permutation-code check pulses for checking the signal for signal-translation error and for reproducing the symbols subject to reduced error.

It is still another object of the invention to provide a new and improved self-correcting pulse-code-communication system for translating a signal representing message-code pulses representative, in 5-digit groups, of discrete message symbols and for reproducing the symbols subject to reduced signal-translation error.

It is another object of the invention to provide a new and improved self-correcting pulse-code-communication system for translating a signal representing message-code pulses representative of discrete message symbols and check-code pulses for checking a plurality of message-code pulse groups for a maximum of one signal-translation error and for reproducing the message symbols subject to reduced error.

It is still another object of the invention to provide a new and improved self-correcting pulse-code-communication system for translating a signal representing message-code pulse groups individually representative of discrete message symbols and a minimum number of check-code pulses for checking a predetermined plurality of message-code pulse groups for signal-translation error and for reproducing the symbols subject to reduced error.

It is still another object of the invention to provide a new and improved self-correcting pulse-code-communication system for translating a signal representing message-code pulse groups individually representative of discrete message symbols and check-code pulses of the same number of digits as a message-code pulse group for checking the signal for signal-translation error and for reproducing the message symbols subject to reduced error.

It is another object of the invention to provide a new and improved self-correcting pulse-code-communication system for translating a signal representing message-code pulses representative of discrete message symbols and for reproducing the symbols subject to reduced error and one capable of operating in conjunction with conventional automatic-telegraph sending and printing equipment.

It is another object of the invention to provide a new and improved self-correcting pulse-code-communication system for translating a signal representing message-code pulses representative of discrete message symbols and synchronized in pulse groups representative of a plurality of such symbols and for reproducing the symbols subject to reduced error.

It is another object of the invention to provide a new and improved self-correcting pulse-code-communication system for translating a signal representing message-code pulses representative of discrete message symbols and for reproducing the symbols subject to reduced error and utilizing for synchronizing groups of the message pulses a plural-digit synchronizing signal which is capable of effecting synchronization notwithstanding one digital error therein.

In accordance with the invention, a pulse-code-transmitting system for transmitting a signal representing message-code pulses representative of discrete message symbols and check-code pulses for checking the signal for signal-translation error comprises first pulse-coding means for developing plural-digit message-code pulse groups individually representative of the aforesaid symbols. The pulse-code-transmitting system also includes pulse-storage means responsive to the pulse-coding means for storing a predetermined plurality of the aforesaid groups and second pulse-coding means responsive jointly to the predetermined plurality of message-code groups for developing a check-code pulse group uniquely representative of predetermined digital relations in the aforesaid plurality of message-code groups.

Also in accordance with the invention, an error-correcting pulse-code-receiving system for receiving a signal representing message-code pulses representative of discrete message symbols and check-code pulses for checking the signal for signal-translation error and for reproducing the symbols subject to reduced error comprises a code-pulse-supply circuit for supplying the aforesaid message-code pulses and check-code pulses. The pulse-code-receiving system also includes pulse-storage means coupled to the supply circuit for storing a predetermined plurality of plural-digit message-code pulse groups individually representative of the aforesaid symbols and a check-code pulse group uniquely representative of predetermined digital relations in the aforesaid plurality of message-code groups. The pulse-code-receiving system also includes error-correcting circuit means responsive jointly to the stored message-code and check-code groups for correcting error in the message-code group and pulse-decoding means responsive to the corrected message-code groups for reproducing the aforesaid symbols.

Also in accordance with the invention, a self-correcting pulse-code-communication system for translating a signal representing message-code pulses representative of discrete message symbols and check-code pulses for checking the signal for signal-translation error and for reproducing the symbols subject to reduced error comprises a pulse-code-transmitting system and a pulse-code-receiving system of the types described.

Also, in accordance with the invention, a pulse-code-transmitting system for transmitting a signal representing message-code pulses representative of discrete message symbols and check-code pulses for checking the signal for signal-translation error comprises first pulse-coding means for developing 5-digit message-code pulse groups individually representative of the symbols and second pulse-coding means responsive jointly to a predetermined plurality of 5-digit message-code groups for developing a 5-digit check-code pulse group uniquely representative of predetermined digital relations in the aforesaid plurality of message-code groups and capable of indicating which is the erroneous digit when a single signal-translation error occurs.

Also in accordance with the invention, an error-correcting pulse-code-receiving system for receiving a signal representing message-code pulses representative of discrete message symbols and check-code pulses for checking the signal for signal-translation error and for reproducing the symbols subject to reduced error comprises a code-pulse-supply circuit for supplying the message-code pulses and the check-code pulses, the system also including error-correcting circuit means responsive jointly to a predetermined plurality of 5-digit message-code pulse groups individually representative of the aforesaid symbols and a 5-digit check-code pulse group uniquely representative of predetermined digital relations in the aforesaid plurality of message-code groups for correcting error in said message-code groups and pulse-decoding means responsive to the corrected message-code groups for reproducing said symbols.

For a better understanding of the present invention, together with other and further objects thereof, reference is had to the following description taken in connection with the accompanying drawings, and its scope will be pointed out in the appended claims.

Figures 1, 1A:
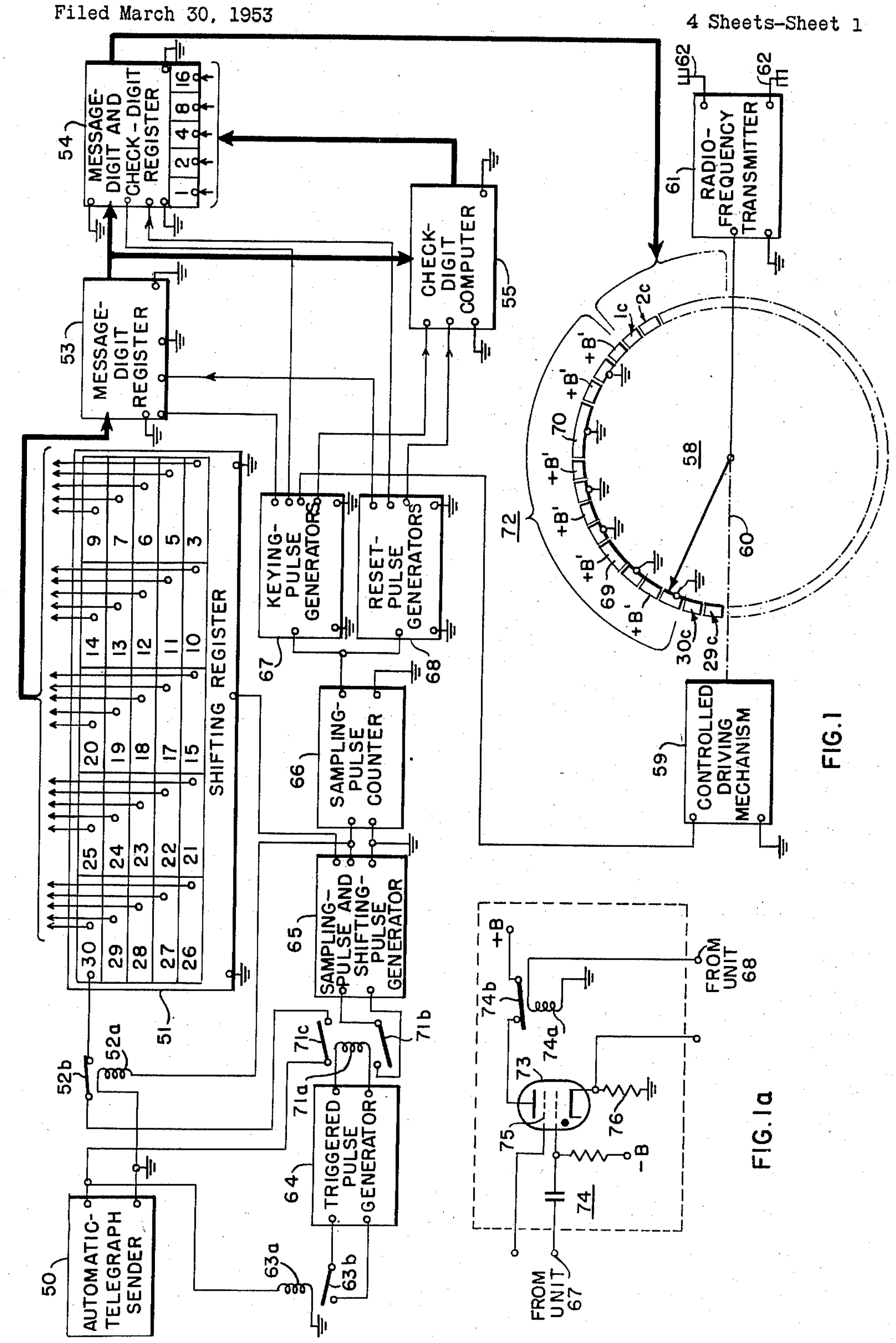

In the accompanying drawings:

Fig. 1 is a circuit diagram, partly schematic, of a pulse-code-transmitting system constructed in accordance with the invention;

Fig. 1*a* is a detailed circuit diagram of a portion of the Fig. 1 system;

Fig. 1*b* is a graph representing the amplitude-time characteristic of a synchronizing signal developed by the Fig. 1 equipment;

Fig. 2 is a schematic circuit diagram of a check-digit computer of the Fig. 1 equipment;

Fig. 3 is a chart utilized in describing the circuit connections and explaining the operation of the Fig. 1 equipment;

*Description of Fig. 1 pulse-code-transmitting system*

Referring now more particularly to Fig. 1 of the drawings, there is represented a pulse-code-transmitting system for transmitting a signal representing message-code pulses representative of discrete message symbols and check-code pulses for checking the signal for signal-translation error. The pulse-code-transmitting system comprises first pulse-coding means for developing plural-digit message-code pulse groups individually representative of the message symbols. The first pulse-coding means comprises, for example, a conventional manually actuated automatic-telegraph sender 50 for sequentially developing binary-permutation-code 5-digit electrical message-pulse groups. The automatic-telegraph sender also includes pulse-developing means for developing start-stop synchronizing digits for each of the message code pulse groups. A suitable automatic-telegraph sender of this type is described at pages 18–26 and 18–27 of "Electrical Engineers' Handbook," Electric Communication and Electronics, Pender and McIlwain, editors, fourth edition, John Wiley & Sons, 1950.

The pulse-code-transmitting system also includes pulse-storage means responsive to the pulse-coding means for storing a predetermined plurality of the aforesaid message-code pulse groups. The pulse-storage means comprises, for example, a shifting register 51 of conventional construction having an input circuit coupled during operation of the equipment to the output circuit of the automatic-telegraph sender 50 through a normally open relay contact 71c and a normally closed contact 52b. More particularly, the shifting register 51 preferably comprises 25 pulse-storage circuit units coupled to the automatic-telegraph sender 50 for individually storing digits of preferably 5 message-pulse groups. The circuit units are individually numbered 3, 5–7, inclusive, 9–15, inclusive, and 17–30, inclusive, for reasons to be explained hereinafter and are coupled in cascade and in the order named but with individual output circuits as indicated on the drawing. The shifting register 51 may be, for example, of the type described in an article entitled "Gate-Type Shifting Register" by Knapton and Stevens, "Electronics," December 1949.

The 25 circuit units of the shifting register 51 are individually connected to 25 circuit units of a message-digit register 53 for storing 25 message digits previously stored by the shifting register 51. For clarity, a single heavy-line arrow is used to indicate the several connections between the units 51 and 53. Plural connections between other units shown in the drawing are indicated in a similar manner. The storage units of the message-digit register 53 are of a well-known type and will be described in detail hereinafter. These units preferably are individually numbered similarly to the corresponding units of the shifting register 51.

The pulse-code-transmitting system also includes second pulse-coding means responsive jointly to the aforesaid predetermined plurality of message-code groups for developing a check-code pulse group uniquely representative of predetermined digital relations in the aforesaid plurality of message-code groups. The second pulse-coding means preferably comprises a check-digit computer 55 responsive jointly to predetermined digital combinations of the plurality of message-code pulse groups for developing a check-code pulse group uniquely representative of the odd-even sum values of message pulses in the combinations. The digital combinations are so determined that each message digit is included in a unique permutation thereof, as will be more fully explained subsequently.

Referring for the moment to Fig. 2, the check-digit computer 55 of the Fig. 1 equipment is there represented in greater detail. More particularly, the check-digit computer comprises control-signal coding means including message-digit scanners coupled to the pulse-storage means comprising the message-digit register 53. The message-digit scanners are represented for simplicity of explanation as mechanical scanners 1a, 2a, 4a, 8a, 16a, but it will be understood that equivalent electrical circuits may be substituted therefor. Each scanner has 14 segments connected to 14 predetermined storage units of the message-digit register 53. The circuit connections between the message-digit register 53 and the scanners 1a, 2a, 4a, 8a, and 16a may be more readily understood with reference to the chart of Fig. 3.

The numbers 3, 5–7, inclusive, 9–15, inclusive, and 17–30, inclusive, designating vertical columns of the Fig. 3 chart individually correspond to the numbers selected for the 25 storage units of the shifting register 51 of the Fig. 1 equipment and for the 25 storage units of the message-digit register 53. The numbers 1, 2, 4, 8, 16, designating horizontal rows of the chart, individually correspond to the Fig. 2 scanners designated by similar numbers. The symbol 1 in any box of the chart indicates a completed circuit connection between the storage unit represented by the column heading and the scanner represented by the row heading. The symbol 0 in any box of the chart indicates the absence of a connection between the storage unit represented by the column heading and the scanner represented by the row heading. For example, storage units 17–30, inclusive, of the register 53 are individually connected to the 14 segments of the scanner 16a, as indicated by the symbol 1 in row 16 of the chart. Similarly, the 14 storage units of the message-digit register 53 connected to the message-digit scanner 8a are units 9–15, inclusive, and 24–30, inclusive, as indicated by row 8 of the chart. The storage units of the message-digit register 53 connected to the scanners 4a, 2a, and 1a are indicated in like manner by the chart. In determining these circuit connections, columns 1, 2, 4, 8, and 16 are not considered for the reason that the message-digit register 53 does not include circuit units corresponding thereto. The significance of these columns will be considered in greater detail hereinafter.

The message-digit scanners 1a, 2a, 4a, 8a, 16a may be operated in synchronism by any suitable means, for example, by a controlled driving mechanism 56 of conventional construction connected to the movable arms of the scanners, as indicated by the broken line 57. The movable arms of the scanners 1a, 2a, 4a, 8a, 16a are coupled to odd-even pulse counters 1b, 2b, 4b, 8b, 16b, respectively, responsive individually to the aforesaid predetermined digital combinations of the predetermined plurality of message-code groups for developing control signals individually and uniquely representative of the odd-even sum values of message pulses in the combinations. The counters may individually comprise, for example, so-called flip-flop circuits, such as described at pages 9–17 of the above-mentioned "Electrical Engineers' Handbook."

The second pulse-coding means further includes second pulse-storage means comprising a message-digit and check-digit register 54 including five storage units 1, 2, 4, 8, 16 and 25 additional storage units individually connected to 25 corresponding storage units of the message-digit register 53 and preferably considered as being numbered similarly for storing the plurality of message-code groups. The storage units of the register 54 preferably are of the same construction as the previously described storage units included in the register 53 although the five units 1, 2, 4, 8, 16 of the register 54 have no numerical counterparts in the register 53. The storage units 1, 2, 4, 8, 16 of the register 54 are connected to the odd-even pulse counters 1b, 2b, 4b, 8b, 16b, respectively, of the check-digit computer 55 for storing the check-code control-signal group.

The second pulse-coding means also includes a message-digit and check-digit scanner 58 coupled to the second pulse-storage means 54 and responsive to the stored message-code and check-code signal groups for deriving therefrom successive message-code and check-code pulses for transmission in a predetermined order, the check-code pulses being individually and uniquely representative of the above-mentioned odd-even message-pulse sum values. The message-digit scanner 58 is represented for simplicity as a mechanical scanner but any suitable electrical equivalent may be substituted therefor. The scanner 58 includes segments 1c–30c, inclusive, shown in part in the drawing, which are individually connected to the 30 storage units of the message-digit and check-digit register 54. The scanner segments 1c–30c, inclusive, for simplicity, will be considered to be arranged in consecutive order although any selected order would be satisfactory.

The scanner 58 also includes 12 additional segments 72 alternately connected to the positive and negative terminals of a source of positive potential +B' for developing suitable synchronizing pulses to be considered in detail hereinafter. The scanner may be operated by any suitable means such as a controlled driving mechanism 59 of conventional construction connected to the movable arm of the scanner, as indicated by the broken line 60. The output circuit of the scanner 58 is connected to a modulation-input circuit of a radio-frequency transmitter 61 of, for example, the frequency-shift modulation type and of conventional construction for developing a radio-frequency signal having a frequency which shifts from one value to another in accordance with the synchronizing pulses, message-code pulses, and check-code pulses applied thereto by the scanner 58. An antenna 62, 62 of a conventional type is coupled to the transmitter 61.

The pulse-code-transmitting system also includes pulse-generating circuit means coupled to the first pulse-coding means 50 and responsive to the synchronizing pulses developed thereby for generating control pulses for triggering the first pulse-storage circuit means comprising the shifting register 51 in synchronism with the development of each of the message-code pulses and for triggering the second pulse-coding means comprising the check-digit computer 55, register 54, and scanner 58 in synchronism with the development of each predetermined plurality of message-code groups. The pulse-generating circuit means comprises a normally energized relay winding 63_a_ connected across the output circuit of the automatic-telegraph sender 50 and having an associated normally open relay contact 63_b_. The relay contact 63_b_ is connected to the input circuit of a triggered pulse generator 64 for generating a delayed output gating pulse having a duration corresponding to 5 digits of the output signal of the automatic-telegraph sender 50 in response to each start-synchronizing digit developed by the sender 50. The triggered pulse generator 64 may comprise, for example, a triggered one-pulse multivibrator, such as that described at pages 9–18 of the above-mentioned "Electrical Engineers' Handbook," and may include a suitable time-delay output circuit.

The output circuit of the triggered pulse generator 64 is connected to a normally de-energized relay winding 71_a_ having normally open contacts 71_b_ and 71_c_ associated therewith. The contact 71_b_ is connected to a sampling-pulse and shifting-pulse generator 65 comprising, for example, a free-running multivibrator, such as described at pages 586 and 587 of the text "Radio Engineering," third edition, by F. E. Terman, McGraw-Hill, 1947, but operative only during the interval of the output gating pulse of the generator 64 when the relay contact 71_b_ is closed.

The shifting-pulse output circuit of the generator 65 comprising one multivibrator output circuit is connected to an input circuit of the shifting register 51 for applying a shifting pulse thereto to shift each message digit stored by a given storage unit to the next storage unit. The sampling-pulse output circuit of the generator 65 comprising another multivibrator output circuit is connected to a relay winding 52_a_ which controls the relay contact 52_b_ closing that contact during an interval of each message digit developed by the automatic-telegraph sender 50. The sampling-pulse output circuit is also connected to a sampling-pulse counter 66 of conventional construction for counting groups of preferably 25 sampling pulses each and for supplying an output trigger pulse for each such group. The counter 66 may comprise, for example, a counter of the type represented in Fig. 1 at pages 9–13 of the above-mentioned "Electrical Engineers' Handbook."

The output circuit of the sampling-pulse counter 66 is connected to the synchronizing input circuits of keying-pulse generators 67 and reset-pulse generators 68 of conventional construction. These pulse generators may individually comprise, for example, a number of triggered relaxation oscillators, such as described at page 9–21 of the above-mentioned Handbook, for generating output pulses at predetermined times.

The output circuits of the keying-pulse generators 67 are connected to the message-digit register 53, the message-digit and check-digit register 54, the controlled driving mechanism 59, and the controlled driving mechanism 56 of the check-digit computer 55 for keying those units at the proper times.

The output circuits of the reset-pulse generators 68 are connected to the message-digit register 53, the message-digit and check-digit register 54, and the odd-even pulse counters of the check-digit computer 55 for resetting the circuits to reference operating conditions at predetermined times.

The pulse-code transmitting system also includes a synchronizing-signal generator comprising the message-digit and check-digit scanner 58 for generating a two-part synchronizing signal for transmission with the plurality of message-code groups and the check-code group. To this end, the scanner 58 includes the 12 previously mentioned segments 72 alternately connected to the positive and negative terminals of the source of potential +B′. These segments are individually so proportioned in length, as indicated in the drawing, that the two parts of the synchronizing signal individually comprise pulse groups distinguishable from each other and from the message-code and check-code groups. More particularly, the scanner includes 10 segments individually of single digit length and two additional segments 69 and 70, preferably of 1½ digit and 2½ digit length, respectively, for developing a 1½ digit pulse and a 2½ digit space between pulses, respectively, with the result that the two parts of the generated synchronizing signal are of nonintegral digital formation individually comprising 6½ and 7½ digits. Of course, any suitable electrical equivalent may be substituted for the scanner 58 to generate the two-part synchronizing signal. A synchronizing-signal generator of the type herein described is described and claimed in the copending application of Richard C. Curtis and Paul Nosal filed concurrently herewith and entitled "Pulse - Code - Communication System."

*Operation of Fig. 1 pulse-code-transmitting system*

As an operator types a message on the keyboard of the automatic-telegraph sender 50, the sender 50 develops electrical message pulses in a usual manner. Each discrete message symbol is represented by a 5-digit message-pulse group preceded by a start-synchronizing digit and followed by a stop-synchronizing digit. Each start-synchronizing digit comprises the absence of a pulse, hereinafter called a space, and de-energizes the relay 63_a_ to control the synchronizing circuits 64–68, inclusive, in a manner explained subsequently. Each stop-synchronizing digit comprises a pulse which energizes the relay 63_a_ until the arrival of the next start-synchronizing digit.

In response to each start-synchronizing digit certain of the synchronizing circuits 64–68, inclusive, energize the relay winding 71_a_, closing the relay contacts 71_b_ and 71_c_ for a predetermined time interval. Also, the relay winding 52_a_ is initially de-energized and is thereafter energized during a portion of the interval of each message digit developed by the automatic-telegraph sender 50. During the periods of energization of the relay winding 52_a_, the relay contact 52_b_ is closed, thereby coupling the automatic-telegraph sender 50 to the pulse-storage unit 30 of the shifting register 51 through the relay contact 71_c_ during a portion of each message-digit interval.

The first message digit applied to the pulse-storage unit 30 of the shifting register 51 comprises a pulse or a space which the unit 30 temporarily stores. Each of the storage units of the shifting register 51 has two operating conditions, one representing a stored pulse and the other representing the absence of a stored pulse or a stored space. In response to the operation of the synchronizing circuits, the shifting register 51 shifts the message digit stored by the unit 30 to the unit 29 prior to the application of the second message digit to the unit 30 and, at the same time, restores the unit 30 to its reference operating condition. The unit 30 then stores the second message digit applied thereto by the automatic-telegraph sender 50 upon the closing of the relay contact 52_b_.

Similarly, during the interval between the application of the second message digit to the unit 30 and the third message digit thereto, the shifting register 51 transfers the first message digit stored in the unit 29 to the unit 28 and the second message digit stored in the unit 30 to the unit 29. At the same time, the unit 30 is restored to its reference operating condition for receiving the third message digit.

The shifting register 51 operates in a manner similar to that just explained for storing the fourth and fifth message digits representing, in conjunction with the first three digits, the first discrete message symbol or letter typed by the operator. Accordingly, the 5 message digits representing the first discrete message symbol are stored for the moment in the units 26–30, inclusive.

When the operator types a second letter, the automatic-telegraph sender 50 applies an additional 5-digit message-pulse group to the shifting register 51 in a manner similar to that just explained in connection with the 5 message digits representing the first letter. Thereupon, the shifting register 51 transfers the 5 message digits representing the first letter from units 26–30, inclusive, to units 21–25, inclusive, respectively, and stores the 5 message digits representing the second letter in the units 26–30, inclusive. Thus, when the operator has typed 5 letters represented by 25 message digits, the 25 message digits will be stored in the order developed in the storage units 3, 5–7, inclusive, 9–15, inclusive, and 17–30, inclusive. The 25 storage units of the shifting register 52 then simultaneously apply signals representing the stored message digits to the message-digit register 53. A high-positive-potential signal preferably represents a message-digit pulse while a low-positive-potential or zero-potential signal preferably represents a message-digit space. At this time, when keyed by one of the synchronizing circuits 64–68, inclusive, the message-digit register 53 stores the 25 message digits applied thereto in 25 individual storage units. The message-digit register 53 then applies signals representing the 25 stored message digits to the check-digit computer 55.

Referring now more particularly to Fig. 2, which represents the check-digit computer 55, the register 53 applies to the message digit scanners **1*a*, 2*a*, 4*a*, 8*a*, and 16*a* predetermined combinations of the signals representing the 25 message digits stored in the register. The message digits may conveniently be referred to by the numbers of the storage units of the shifting register 51 which the digits last occupied in that register. For example, the first message digit of the first 5-digit message-pulse group representing the first discrete message symbol will be referred to as message digit 3, the next as message digit 5, etc. The numbers of these message digits then also individually correspond to the numbers of the storage units of the message-digit register 53 which apply signals representing the digits to the check-digit computer 55 by circuit connections previously described. Accordingly, as represented by the Fig. 3 chart, signals individually representative of message digits 17–30, inclusive, are simultaneously applied to the message-digit scanner 16*a* by the message-digit register 53. Similarly, signals representing message digits 9–15, inclusive, and 24–30, inclusive, are simultaneously applied to message-digit scanner 8*a*. The message digits represented by signals applied to the scanners 4*a*, 2*a*, and 1*a* are indicated in like manner by the Fig. 3 chart. The signals representative of the message digits ordinarily are unidirectional potentials similar to those applied to the message-digit register 53** and mentioned previously.

In response to a keying pulse supplied at the proper time by one of the synchronizing circuits 64–68, inclusive, the controlled driving mechanism 56 then once rotates the movable arms of the scanners **1*a*, 2*a*, 4*a*, 8*a*, and 16*a* which scan the signals applied thereto representing the message digits. Thereupon, the scanners 1*a*, 2*a*, 4*a*, 8*a*, and 16*a* apply to the odd-even pulse counters 1*b*, 2*b*, 4*b*, 8*b*, and 16*b*, respectively, pulses representative of the pulses stored by the message-digit register 53. For example, if the message-digit register 53 has pulses stored in units 17–23, inclusive, thereof, and spaces stored in units 24–30, inclusive, thereof, the message-digit scanner 16*a* applies 7 high-potential pulses to the odd-even pulse counter 16*b* causing the counter 16*b* to alternate between two operating conditions in the usual manner of a "flip-flop" circuit. When an odd number of pulses are applied thereto, the counter 16*b* assumes a final operating condition different from its initial or reference operating condition. If an even number of pulses are applied to the counter 16*b*, the final operating condition is the same as the initial operating condition thereof, since the counter then changes operating conditions an even number of times. Accordingly, there is developed in the output circuit of the counter 16*b* a signal representative of the final operating condition thereof and, thus, of the odd-even sum value of the pulses applied thereto. The operating conditions of the counter 16*b*** may, for example, be so selected that a high potential is developed in the output circuit thereof when an odd number of pulses are applied thereto and a low potential developed when an even number of pulses are applied.

The counters **1*b*, 2*b*, 4*b*, and 8*b* operate in a manner similar to that just explained in connection with the counter 16*b*. Accordingly, the odd-even pulse counters 1*b*, 2*b*, 4*b*, 8*b*, and 16*b* develop a group of 5 control signals uniquely representative of the odd-even sum values of message pulses in predetermined digital combinations of the message-code pulse groups applied thereto. These 5 control signals then represent 5 check digits individually comprising check pulses or spaces as determined by the number of pulses in each of the predetermined message-digit combinations individually scanned by scanners 1*a*, 2*a*, 4*a*, 8*a*, and 16*a*. For example, under the assumed operating conditions of the check-digit computer 55**, the computer develops a high potential representing a check pulse when the corresponding message-digit combination checked includes an odd number of message pulses. Also, a low potential representing a check space is developed when the corresponding message-digit combination includes an even number of check pulses. The total number of pulses in each predetermined message-digit combination and the check digit corresponding thereto then is always even.

The odd-even pulse counters **1*b*, 2*b*, 4*b*, 8*b*, and 16*b* simultaneously apply the control signals developed thereby to storage units 1, 2, 4, 8, and 16, respectively, of the message-digit and check-digit register 54. At the same time, signals representing the 25 message digits stored by the message-digit register 53 are applied to 25 corresponding pulse-storage units of the message-digit and check-digit register 54, making a total of 30 signals representative of 30 digits applied to the message-digit and check-digit register 54. Then the synchronizing circuits trigger the message-digit and check-digit register 54 to cause the register to store the 25 message digits and 5 check digits. Accordingly, the message-digit and check-digit register 54 simultaneously applies signals representative of the 30 digits to segments 1–30, inclusive, of the message-digit and check-digit scanner 58**.

In response to the operation of the synchronizing circuits, the controlled driving mechanism 59 then once rotates the movable arm of the message-digit and check-digit scanner 58 which develops a 30-digit message-code pulse group representative of the 5-digit message-code pulse groups and the 5-digit check-code pulse group stored by the register 54 together with synchronizing pulses to be considered subsequently. The scanner 58 applies the synchronizing signal and the 30-digit message-code and check-code pulse group to the radio-frequency transmitter 61 which develops a frequency-shift-modulated radio-frequency signal representative of the applied synchronizing pulses and message and check pulses for application to the antenna 62, 62. The antenna 62, 62, in turn, radiates the developed signal.

To aid in further understanding the significance of the 5 check digits 1, 2, 4, 8, and 16 transmitted with the 25 message digits, the formation of the Fig. 3 chart will now be considered. As pointed out previously, the chart represents the connections between the message-digit register 53 and check-digit computer 55. These connections are such that each message digit is included in a unique permutation of the 5 message-digit combinations applied individually to the 5 message-digit scanners 1*a*, 2*a*, 4*a*, 8*a*, and 16*a*. For example, as represented by the Fig. 3 chart, message digit 7 is included in the message-digit combinations applied by the message-digit register 53 to scanners 1*a*, 2*a*, 4*a* but not in the combinations applied to scanners 8*a* and 16*a*. No other message digit is applied only to scanners 1*a*, 2*a*, and 4*a*.

Since there are 5 message-digit combinations, $2^5$ or 32 permutations of those combinations exist while only 30 permutations are required to provide a permutation which uniquely represents each message and check digit. The 32 permutations may conveniently be designated as the binary-code representations of the numbers 0–31, inclusive. For simplicity, the 30 permutations selected are those corresponding to the binary-code representations of numbers 1–30, inclusive. Accordingly, each of the numbers 1–30, inclusive, of the Fig. 3 chart designating a message or check digit is represented in binary code by the permutation in the corresponding column of the chart reading from row 16 to row 1.

These permutations may be used in the manner explained previously to indicate the proper circuit connections between the message-digit register 53 and the check-digit computer 55. It will be apparent, however, that a designation of a given storage unit and the digit stored thereby by the number represented in binary code by the unique permutation of message-digit combinations including the stored digit is not necessary and is merely for convenience. Also, for the sake of simplicity and to cause each check digit to affect only one of the digital combinations to be checked at the receiver in a manner subsequently to be explained, digits 1, 2, 4, 8, and 16 are selected as check digits, as indicated by the letter C on the chart. The remaining 25 digits are selected as message digits.

It has been shown in an article entitled "Error Detecting and Error Correcting Codes," by R. W. Hamming in the April 1950 issue of the Bell System Technical Journal, published by American Telephone & Telegraph Company, that the minimum number of check digits necessary to check a given number of message digits for a single error may be derived from the equation $$2^k \geqq m+k+1$$

where:

$k$=the number of check digits
$m$=the number of message digits

Accordingly, a minimum of 5 check digits is required to check 25 message digits.

Returning to a consideration of the Fig. 1 transmitting system, and more particularly to the synchronizing circuits 64–68, inclusive, thereof, the manner in which those circuits operate will now be explained. As mentioned previously, upon the application of each start-synchronizing digit to the relay winding 63*a*, that relay de-energizes causing the contact 63*b* to close. The closing of the contact 63*b* triggers the triggered pulse generator 64 which, after a suitable time delay of the order of ½ digit, energizes the relay winding 71*a* during the interval of the output pulse developed thereby. The duration of the output pulse of the triggered pulse generator 64 and, consequently, of the period of energization of the relay winding 71*a* is approximately equal to the time required for the development of 5 message digits by the automatic-telegraph sender 50.

When the relay winding 71*a* is energized, the relay contact 71*c* closes, connecting one output terminal of the automatic-telegraph sender 50 to the relay contact 52*b*, and the relay contact 71*b* closes, causing the alternate generation of shifting pulses and sampling pulses by the generator 65. The first shifting pulse developed is applied to the shifting register 51 to shift the digits stored by that register from each storage unit to the succeeding unit, thereby clearing the storage unit 30 for the application of a message digit thereto. While the first shifting pulse is generated, the generator 65 de-energizes the relay winding 52*a*, opening the relay contact 52*b* temporarily to maintain the unit 50 disconnected from shifting register 51. The first shifting pulse is then followed by a sampling pulse which energizes the winding 52*a*, closing the contact 52*b* during a portion of the interval of the first message digit to connect the automatic-telegraph sender 50 to the shifting register 51 at that time. After 5 shifting pulses and 5 sampling pulses have been generated by the unit 65 in a similar manner, the relay contact 71*b* opens causing the operation of the generator to cease. At the same time the relay contact 71*c* opens, disconnecting the unit 50 from the relay contact 52*b* and the shifting register 51.

The generator 65 also applies the sampling pulses developed thereby to the sampling pulse counter 66. When 25 sampling pulses have been counted by the counter 66, indicating that 25 message digits have been generated by the automatic-telegraph sender 50, the counter 66 applies a trigger pulse to the keying-pulse generators 67 and the reset-pulse generators 68. The keying-pulse generators 67 at suitable delay times trigger the message-digit register 53, the message-digit and check-digit register 54, and the controlled driving mechanisms 56 and 59. When the message-digit register 53, the message-digit and check-digit register 54, and the odd-even pulse counters of the check-digit computer 55 have individually performed their previously described functions after the development of each plurality of 25 message digits, the reset-pulse generators 68 apply reset pulses thereto at suitable times to reset the various units to reference operating conditions and thereby condition the units for operation upon the development of the next plurality of 25 message digits.

Returning now to a consideration of the generation of the two-part synchronizing signal by the scanner 58, the scanner develops the synchronizing signal once during each revolution of the scanner arm as it sweeps clockwise by the segments 72. The normal rest position of the scanner arm between sweeps is at the first synchronizing segment, as shown in the drawing. Accordingly, the scanner develops the synchronizing signal immediately before scanning each group of 30 message-code and check-code digits.

As the arm of the scanner 58 sweeps across the segments 72, the potential picked off the segments by the arm changes abruptly from that of the negative terminal of the source +B′ to the potential of the positive terminal thereof, since the segments are alternately connected to the negative and positive terminals. Since all the segments of the scanner except the segments 69 and 70 are of the same single-digit length, the amplitude-time characteristic of the potential developed at the scanner arm may be represented as a series of alternate pulses and spaces of the same duration except for the pulse and space corresponding to the segments 69 and 70, respectively, as shown by the graph of Fig. 1*b*. Accordingly, the signal comprises pulses A–F, inclusive, generated as the scanner arm sweeps by the segments connected to the positive terminals of the source +B′ and having intervening spaces generated as the scanner arm sweeps by the segments connected to negative terminals of the source +B′. Pulses A and C–F, inclusive, are of single-digit duration since the segments causing the generation of these pulses are of single-digit length. Pulse B, however, is of 1½ digit duration since the segment 69 corresponding thereto has a 1½ digit length. Each of the spaces except space Z is of single-digit duration since the corresponding segments are of single-digit length. The space Z, however, has a 2½ digit duration since the segment 70 corresponding thereto has a 2½ digit length.

The synchronizing signal may, therefore, be considered as comprising two parts, so indicated on Fig. 1*b*. Part 1 is of 6½ digit duration including pulses A and C and the 1½ digit pulse B while Part 2 is of 7½ digit duration including the 2½ digit space Z as indicated on the graph.

The radio-frequency transmitter 61 develops radio-frequency synchronizing pulses in the manner previously explained in response to the synchronizing signal which is applied thereto as a modulating signal by the scanner 58. The amplitude-time characteristic of these radio-frequency synchronizing pulses, of course, is similar to that represented by the Fig. 1*b* graph.

*Description of Fig. 1a storage unit*

Referring now more particularly to Fig. 1*a* of the drawings, there is represented in detail a pulse-storage unit of the type which may be included in the message-digit register 53 and the message-digit and check-digit register 54. The message-digit register 53 includes 25 such units having common keying-pulse input terminals and common reset-pulse input terminals but individual message-pulse input terminals. The message-digit and check-digit register 54 is of similar construction but includes 30 pulse-storage units.

The Fig. 1*a* pulse-storage unit comprises a normally nonconductive gas-filled, multigrid thyratron tube 73. A keying-pulse input circuit adapted for connection to a keying-pulse generator of unit 67 of Fig. 1 and comprising a coupling condenser-grid-leak resistor network 74 is connected to a first control electrode of the tube 73. A source of bias potential —B is included in the control electrode-cathode circuit of the tube 73 to maintain the tube normally nonconductive. A second control electrode 75 is adapted for connection to one of the pulse-storage units of the shifting register 51 of the Fig. 1 transmitting system. The anode-cathode circuit of the tube 73 includes a cathode-load resistor 76 across which an output signal is developed and a relay contact **74*b* associated with a relay winding 74*a* connected to one of the reset-pulse generators of the unit 68**.

*Operation of Fig. 1a storage unit*

Considering now the operation of the Fig. 1*a* storage unit, the thyratron tube 73 thereof is normally nonconductive as mentioned previously. To render the tube conductive, a relatively high positive potential representative of a stored pulse must be applied to the control electrode 75 at the time a positive keying pulse is applied to the input circuit 74 of the tube. Under such operating conditions the tube fires when the keying pulse is applied thereto developing across the cathode-load resistor 76 a relatively high positive potential which represents a pulse stored by the storage unit.

The storage unit is restored to its normally nonconductive condition by the application of a reset pulse to the relay winding **74*a*. At this time the relay winding 74*a* is energized, opening the contact 74*b* and rendering the tube 73** nonconductive.

In the event that a relatively low positive potential or a potential of zero value representing a space is applied to the control electrode 75, the keying pulse applied to the input circuit 74 is ineffective to render the tube 73 conductive. Accordingly, no positive potential is then developed across the cathode resistor 76, indicating that the storage unit is storing a space rather than a pulse.

Figure 4:
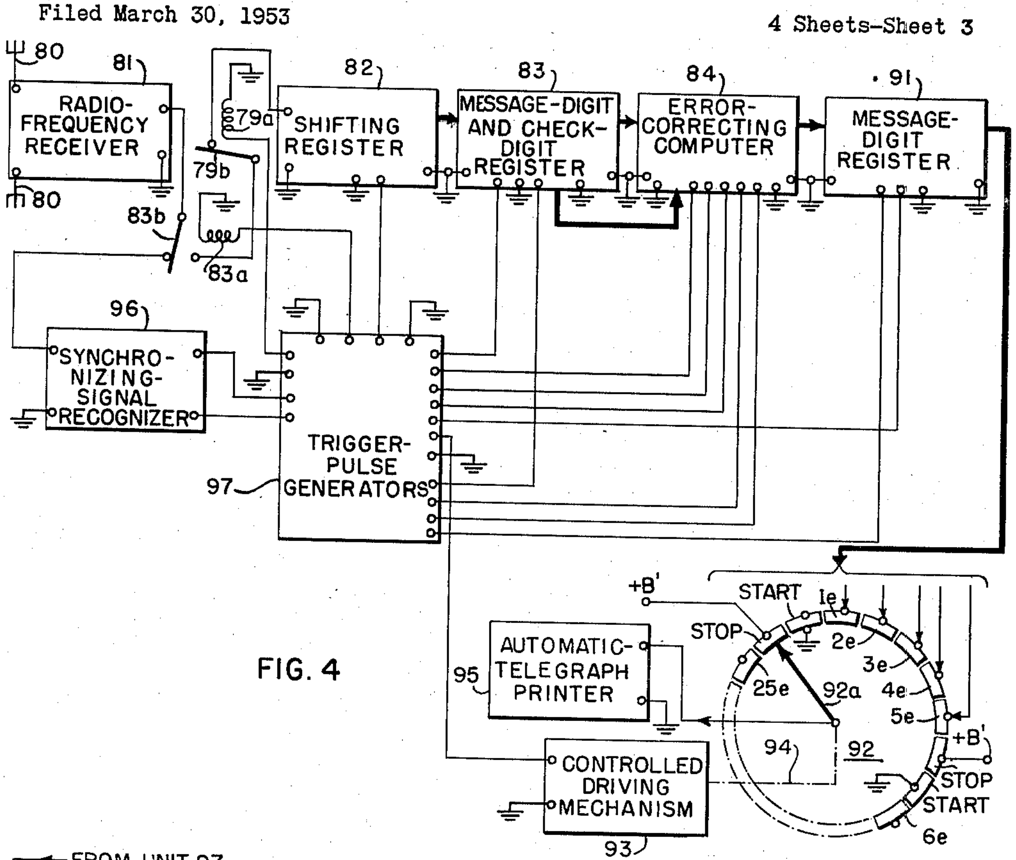
Fig. 4 is a circuit diagram, partly schematic, of a pulse-code-receiving system constructed in accordance with the invention.

*Description of Fig. 4 pulse-code-receiving system*

Referring now more particularly to Fig. 4 of the drawings, there is represented a pulse-code-receiving system constructed in accordance with the invention. The pulse-code-receiving system comprises a code-pulse-supply circuit for supplying message-code pulses and check-code pulses. The code-pulse-supply circuit preferably comprises a receiver antenna 80, 80 and a radio-frequency receiver 81 of, for example, the frequency-shift modulation type and of conventional construction coupled thereto.

The receiving system also includes first pulse-storage means coupled to the supply circuit comprising the radio-frequency receiver 81 for storing a predetermined plurality of message-code pulse groups and the check-code pulse group transmitted therewith. The pulse-storage means preferably comprises pulse-triggered circuit units for storing 5-digit message-code pulse groups individually representative of the message symbols and one check-code pulse group uniquely representative of predetermined digital relations in 5 such message-code groups. More particularly, the pulse-storage means comprises, for example, a shifting register 82 which may be generally similar in construction to the shifting register 51 of the Fig. 1 transmitting system but includes 30 pulse-triggered storage units individually having two operating conditions, one representing a stored pulse and the other representing the absence of a stored pulse. The radio-frequency receiver 81 is coupled to the input circuit of the shifting register 82 through a relay contact **83*b* and a normally closed relay contact 79*b*** in a manner more fully described hereinafter.

The 30 storage units of the shifting register 82 are individually connected to 30 storage units of a message-digit and check-digit register 83 which preferably is also included in the first pulse-storage means and may be of similar construction to the message-digit and check-digit register 54 of the Fig. 1 transmitting system for storing 5 message-code pulse groups of 5 digits each and a check-code pulse group of 5 digits.

The pulse-code-receiving system also includes error-correcting circuit means responsive jointly to the stored message-code and check-code groups for correcting error in the message-code groups. The error-correcting circuit means comprises an error-correcting computer 84, preferably responsive jointly to predetermined digital combinations of the message-code and check-code groups for deriving the odd-even pulse-sum values thereof.

Figure 5:
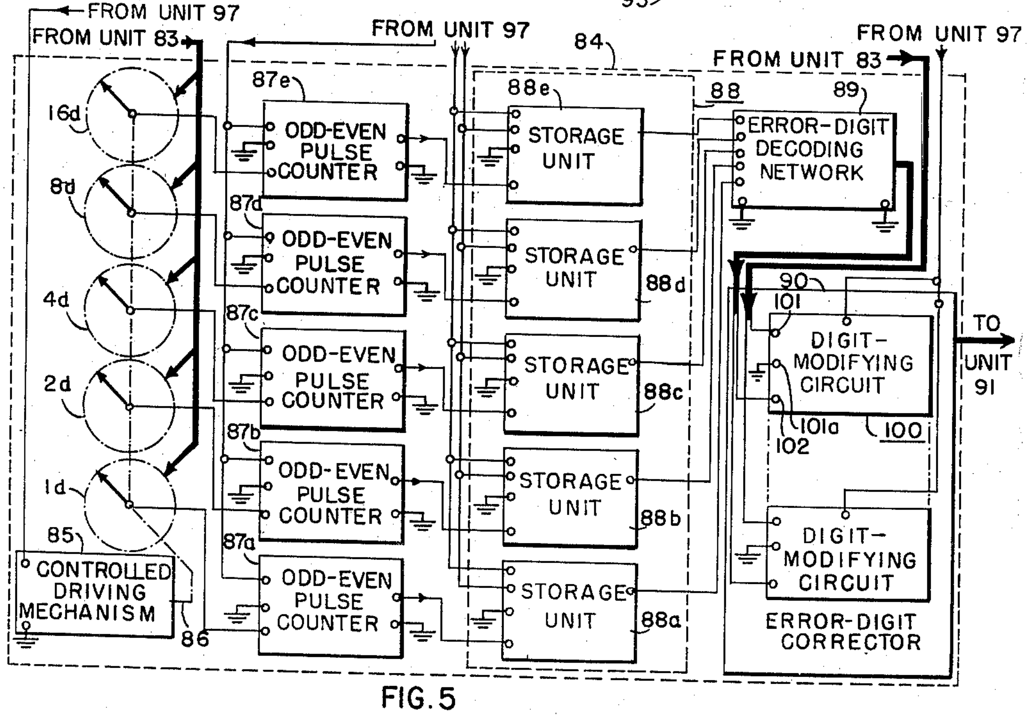
Fig. 5 is a schematic circuit diagram of an error-correcting computer of the Fig. 4 equipment.

Referring for the moment to Fig. 5, the error-correcting computer 84 is there represented in greater detail. The computer comprises message-digit and check-digit scanners **1*d*, 2*d*, 4*d*, 8*d*, 16*d* individually responsive to predetermined digital combinations of the message-code and check-code pulse groups. The message-digit and check-digit scanners are represented for simplicity of explanation as mechanical scanners but suitable equivalent electrical circuits may be substituted therefor. Each scanner has 15 segments connected to 15 predetermined storage units of the message-digit and check-digit register 83. The circuit connections between the message-digit and check-digit register 83 and the scanners 1*d*, 2*d*, 4*d*, 8*d*, and 16*d*** may be more readily understood by referring to the Fig. 3 chart.

As explained in connection with the Fig. 1 transmitting system, the symbol 1 in any box of the Fig. 3 chart indicates a circuit connection between the storage unit represented by the column heading and the scanner represented by the row heading while the symbol 0 in any box of the chart indicates the absence of a connection between the storage unit and the scanner. The message-digit and check-digit register includes 30 storage units which may be considered as numbered consecutively from 1–30, inclusive. Storage units 16–30, inclusive, are individually connected to the 15 segments of the scanner **16*d* as indicated by the symbol 1 in row 16 of the chart. Similarly, the 15 storage units of the message-digit and check-digit register 83 connected to the message-digit and check-digit scanner 8*d* are units 8–15, inclusive, and 25–30, inclusive, as indicated by row 8 of the chart. The storage units of the message-digit and check-digit register 83 connected to the scanners 4***d*, 2*d*, and 1*d* are indicated in like manner by the chart.

The message-digit and check-digit scanners 1*d*, 2*d*, 4*d*, 8*d*, 16*d* may be operated in synchronism by any suitable means such as, for example, a controlled driving mechanism 85 of conventional construction connected to the movable arms of the scanners as indicated by the broken line 86. The movable arms of the scanners 1*d*, 2*d*, 4*d*, 8*d*, 16*d* are connected to odd-even pulse counters 87*a*–87*e*, inclusive, respectively, for developing control signals representing the odd-even sum values of the message-code and check-code pulses of the last-mentioned combinations, these values being jointly representative in code of the digits of any single signal-translation error in the predetermined plurality of message-code groups. The odd-even counters 87*a*–87*e*, inclusive, may, for example, be of similar construction to the odd-even pulse counters 1*a*, 2*a*, 4*a*, 8*a*, 16*a* of the Fig. 2 check-digit computer.

There are also provided second pulse-storage circuit units 88*a*–88*e*, inclusive, of an error-digit code register 88 coupled to the counters 87*a*–87*e*, inclusive, respectively, for storing the control signals developed thereby. Units 88*a*–88*e*, inclusive, may individually be of construction similar to the pulse-storage unit represented by Fig. 1*a* of the drawings.

An error-digit decoding network 89 is coupled to the second pulse-storage units and has a plurality of output circuits individually corresponding to the message-code digits stored by the Fig. 4 message-digit and check-digit register 83 for developing a control signal in that output circuit corresponding to the erroneous message-code digit. More particularly, the error-digit decoding network 89 has 5 input circuits individually connected to the pulse-storage units of the error-digit code register 88 and 25 output circuits individually corresponding to the 25 message digits in the predetermined plurality of 5 message-code pulse groups. These 25 output circuits may be considered as being numbered 3, 5–7, inclusive, 9–15, inclusive, and 17–30, inclusive, to correspond with the selected numbering of the message-digits. An error-digit decoding network of a type suitable for use as the network 89 is described in an article entitled "Rectifier Networks for Multiposition Switching" by D. R. Brown and N. Rochester in the February 1949 issue of the Proceedings of the I. R. E., published by The Institute of Radio Engineers, Inc.

The error-correcting computer also includes an error-digit corrector 90 comprising digit-modifying circuits individually coupled to the output circuits of the error-digit decoding network 89 and to the message pulse-storage units of the message-digit and check-digit register 83 for correcting the erroneous message-code digit. The error-digit corrector 90 preferably comprises 25 digit-modifying circuits such as the one represented in Fig. 6 which will be described in detail hereinafter.

Referring again to Fig. 4, the error-correcting circuit means preferably also includes third pulse-storage circuit units individually coupled to the digit-modifying circuits of the error-correcting computer 84 for storing the corrected message-code digits. More particularly, these pulse-storage units comprise a message-digit register 91 which may be of similar construction to the message-digit register 53 of the Fig. 1 transmitting system.

The pulse-code-receiving system also includes pulse-decoding means responsive to the corrected message-code groups for reproducing the discrete message symbols. The pulse-decoding means preferably comprises a pulse-triggered message-digit scanner 92 represented for simplicity of explanation as a mechanical scanner. The message-digit scanner 92 is coupled to the pulse-storage circuit units of the message-digit register 91 for sequentially deriving therefrom the corrected message-code pulses in groups in a predetermined order and for generating start-stop synchronizing digits for each such group. The scanner comprises several segments of single-digit length shown in part in the drawing. The segments connected to the pulse-storage circuit units of the message-digit register 91 are numbered 1*e*–25*e*, inclusive, and are separated in groups of 5 by segments designated stop and start and connected to the positive and negative terminals of a source +B′, respectively, as indicated in the drawing. The scanner also includes a movable arm 92*a* connected to a controlled driving mechanism 93 of conventional construction as indicated by the broken line 94.

The pulse-decoding means also includes an automatic-telegraph printer 95 responsive to the corrected message-code pulse groups and to the start-stop synchronizing digits for sequentially reproducing the discrete message symbols subject to reduced error. The automatic-telegraph printer may be of conventional construction, for example, of the type described at pages 18–27 to 18–29, inclusive, of the above-mentioned "Electrical Engineers' Handbook."

The receiving system further includes synchronizing circuits comprising a synchronizing-signal recognizer 96 coupled to the relay contact 83*b* of the radio-frequency receiver 81 and responsive to either part of the received two-part synchronizing signal. The synchronizing-signal recognizer 96 will subsequently be described in detail. There are also provided trigger-pulse generators 97 generally similar in construction to the synchronizing circuits of the Fig. 1 transmitting system comprising the relay winding 63*a*, relay contact 63*b*, triggered-pulse generator 64, relay winding 71*a*, relay contact 71*b*, sampling-pulse and shifting-pulse generator 65, sampling pulse counter 66, keying-pulse generators 67, and reset pulse generators 68. The trigger-pulse generators 97 are coupled to the recognizer 96 for generating pulses for triggering the pulse-storage means comprising the shifting register 82 in synchronism with the supply of individual digits of the message-code groups and for triggering the error-correcting circuit means comprising units 84 and 91 and the pulse-decoding means comprising the scanner 92 in synchronism with the supply of a predetermined plurality of message-code groups. In particular, various trigger-pulse generators of unit 97 are connected to the controlled driving mechanism 85 and the storage units 88*a*–88*e*, inclusive, of the computer 84 for triggering those circuits. A relay winding 83*a* associated with the contact 83*b* and a relay winding 79*a* associated with the contact 79*b* are also connected to the trigger-pulse generators 97 for operation in synchronism with the supply of the predetermined plurality of message-code groups. Connections are also provided from various reset-pulse generators of the unit 97 to the registers 83 and 91 and to the odd-even pulse counters 87*a*–87*e*, inclusive, and storage units 88*a*–88*e*, inclusive, of the computer 84 for resetting those circuits to their reference operation conditions at proper times.

*Operation of Fig. 4 pulse-code-receiving system*

Considering now the operation of the Fig. 4 pulse-code-receiving system, the radio-frequency receiver 81 derives the modulation components of the radio-frequency signal representing synchronizing pulses and message-code and check-code pulses and transmitted by the Fig. 1 pulse-code-transmitting system and intercepted by the antenna 80, 80 of the Fig. 4 receiving system. The pulses derived from the received signal are applied to the synchronizing-signal recognizer 96 which triggers the trigger-pulse generators 97 in a manner more fully explained subsequently. One of the trigger-pulse generators 97 then applies to the relay winding 83*a* a pulse which energizes the relay winding 83*a* during the entire period of reception of the message-code and check-code pulses.

While the relay winding 83*a* is energized, closing the contact 83*b*, the radio-frequency receiver is coupled to the shifting register 82 to apply the received message-code and check-code pulses thereto during sampling intervals when the relay contact 79*b* is closed, as determined by the operation of the trigger-pulse generators 97. The shifting register 82 operates in a manner similar to the shifting register 51 of the Fig. 1 transmitting system for storing the 25 message-code and 5 check-code digits representing 5 message symbols together with check-code information. To this end, the trigger-pulse generators 97 apply a group of 30 shifting pulses to the shifting register 82 individually followed in time by 30 sampling pulses which are applied to the relay winding **79*a*. When the 30 message-code and check-code digits of a received-signal digit group have been stored by the shifting register 82, the 30 storage units of the shifting register then simultaneously apply signals representing the stored digits to the message-digit and check-digit register 83. At this time, when keyed by one of the trigger-pulse generators 97, the message-digit and check-digit register 83 stores the 30 digits applied thereto in 30 individual storage units. The message-digit and check-digit register 83 then applies signals representing the 30 stored digits to the error-correcting computer 84**.

Assuming that during signal-transmission from the Fig. 1 transmitting system to the Fig. 4 receiving system there has been no signal-translation error in any of the 30 message-code and check-code signal digits, the error-correcting computer applies signals representing the 25 message digits as received to the message-digit register 91 which stores the same when triggered by one of the trigger-pulse generators 97. The message-digit register 91 then applies signals representing the 25 stored message digits to the 25 segments **1*e*–25*e*, inclusive, of the message-digit scanner 92**.

When triggered by one of the trigger-pulse generators 97, the controlled driving mechanism 93 once rotates the movable arm of the message-digit scanner 92 which develops in succession 5-digit message-code pulse groups individually preceded by a start-synchronizing digit and followed by a stop-synchronizing digit and corresponding to the signal generated by the automatic-telegraph sender 50 of the Fig. 1 transmitting system. The start-synchronizing and stop-synchronizing digits just mentioned are generated by the scanner 92 as the movable arm **92*a*** thereof sweeps by the start and stop segments of the scanner immediately preceding and following each group of 5 message-digit segments. The normal rest position of the scanner arm between sweeps is at a stop segment, as shown in the drawing.

The automatic-telegraph printer 95 responds to the signal applied thereto by the scanner 92 in a well-known manner to reproduce the discrete message symbols typed by the operator of the automatic-telegraph sender 50 of the Fig. 1 transmitting system.

In the event that the radio-frequency signal transmitted from the Fig. 1 transmitting system to the Fig. 4 receiving system sustains a single signal-translation error in one of the message digits thereof, changing the digit, for example, from a pulse to a space, or vice versa, the message digits stored by the shifting register 82 and the message-digit and check-digit register 83 then include an erroneous digit. This erroneous digit, if not corrected, would cause an error in one letter of the 5-letter word represented by the 25 message digits. It is the function of the error-correcting computer 84 to determine whether a single signal-translation error in one of the message digits has occurred, and if so, to correct the erroneous digit.

Referring for the moment to Fig. 5, which represents the error-correcting computer 84, the 30 message-code and check-code digits, including the erroneous message digit, are applied in predetermined digital combinations to the message-digit and check-digit scanners **1*d*, 2*d*, 4*d*, 8*d*, and 16*d*. As explained previously in connection with the Fig. 3 chart, the message-digit and check-digit register 83 applies digits 16–30, inclusive, to the message-digit and check-digit scanner 16*d* while the register 83 applies digits 8–15, inclusive, and 24–30, inclusive, to the scanner 8*d*. The predetermined digital combinations applied to the scanners 4*d*, 2*d*, and 1*d*** are indicated in like manner by the chart.

In response to a trigger pulse supplied at the proper time by one of the trigger-pulse generators 97, the controlled driving mechanism 85 then once rotates the movable arms of the scanners **1*d*, 2*d*, 4*d*, 8*d*, and 16*d* which scan the signals applied to the scanner segments and representing the message and check digits in a manner similar to the scanning of the message digits by the message-digit scanners 1*a*, 2*a*, 4*a*, 8*a*, and 16*a* of the Fig. 2 check-digit computer. Accordingly, the message-digit and check-digit scanners 1*d*, 2*d*, 4*d*, 8*d*, 16*d* apply to the odd-even pulse counters 87*a*–87*e*, inclusive, respectively, pulses representative of the pulses stored by the message-digit and check-digit register 83**.

If the erroneous message digit is not included in the digital combination represented by signals applied to a given scanner, that scanner applies an even number of pulses to the corresponding odd-even pulse counter. For example, assuming that message digit 7 was transmitted as a pulse and sustained error causing it to be received as a space, the digital combination represented by signals applied to the message-digit and check-digit scanner **16*d* is not affected by the error since that combination does not include message digit 7. Message-digit and check-digit scanner 16*d* responds to message digits 17–30, inclusive, and to check digit 16 which was added to make the total of the pulses in digits 16–30, inclusive, an even number. Accordingly, notwithstanding the error in message digit 7, message-digit and check-digit scanner 16*d* applies an even number of pulses to the odd-even pulse counter 87*e*. Similarly, since message digit 7 is not included in the predetermined digital combination applied to message-digit and check-digit scanner 8*d*, that scanner applies an even number of pulses to the odd-even pulse counter 87*d***.

The predetermined digital combination represented by signals applied to message-digit and check-digit scanner **4*d*, however, includes message digit 7, as indicated by the Fig. 3 chart. As also indicated by the chart, check digit 4 was added to the predetermined digital combination of message digits 5–7, inclusive, 12–15, inclusive, 19–23, inclusive, and 28–30, inclusive, to make the total of the pulses in that combination together with the check digit 4 an even number. Accordingly, since message digit 7 sustained an error changing from a pulse to a space, message-digit and check-digit scanner 4*d* applies an odd number of pulses to the odd-even pulse counter 87*c*. Likewise, message-digit and check-digit scanners 1*d* and 2*d* apply an odd number of pulses to odd-even pulse counters 87*a* and 87*b*, respectively, since message digit 7 is included in each of the predetermined digital combinations aplied to the message-digit and check-digit scanners 1*d* and 2*d***.

The odd-even pulse counters **87*a*–87*e*, inclusive, operate in a manner similar to the odd-even pulse counters 1*b*, 2*b*, 4*b*, 8*b*, and 16*b* of the Fig. 2 check-digit computer, that is, each counter develops, for example, a high potential in the output circuit thereof when an odd number of pulses is applied thereto and develops a low potential therein when an even number of pulses is applied thereto. Accordingly, under the assumed operating conditions, counters 87*a*–87*c*, inclusive, develop high potentials in the output circuits thereof while counters 87*d* and 87*e* develop low potentials. This permutation of output-circuit potentials uniquely indicates that an error has occurred in message digit 7. If the error had occurred in another message digit, another unique permutation of output-circuit potentials would be developed by the odd-even pulse counters 87*a*–87*e***, inclusive.

The odd-even pulse counters **87*a*–87*e*, inclusive, apply the 5 signals uniquely representing that an error has occurred in message digit 7 to storage units 88*a*–88*e*, inclusive, respectively, of the error-digit code register 88. When triggered by a pulse from one of the trigger pulse generators 97, the error-digit code register 88 stores the signal permutation applied thereto. The register 88 then applies the stored signals to the error-digit decoding network 89 which, as previously mentioned, has 25 output circuits individually corresponding to the 25 message digits. The error-digit decoding network develops a positive output potential only in the one of the 25 output circuits corresponding to an erroneous message digit, for example, output circuit 7 corresponding to the message digit 7. This output circuit of the error-digit decoding network 89 then applies the developed potential to the corresponding digit-modifying circuit of the error-digit corrector 90, for example, digit-modifying circuit 7. Message-digit and check-digit register 83 also applies the 25 message digits stored therein, including the erroneous digit 7, individually to the 25 digit-modifying circuits of the error-digit corrector 90**.

Digit-modifying circuit 7 responds to the signal developed in the output circuit 7 of the error-digit decoding network 89 and to the signal representing message digit 7 supplied by the message-digit and check-digit register 83 to change the erroneous message digit 7 from a space to a pulse, in a manner more fully described subsequently. The remaining digit-modifying circuits of the error corrector 90 effectively translate the digits represented by signals applied thereto without modification. Accordingly, the error-digit corrector 90 develops in the 25 output circuits of the 25 digit-modifying circuits thereof signals representing the message digits including message digit 7 as corrected. The error-digit corrector 90 applies the corrected message-digit group to the message-digit register 91 of the Fig. 4 receiving system which operates in conjunction with the scanner 92 and the automatic-telegraph printer 95, in the manner previously described, to reproduce the discrete message symbols typed by the operator of the automatic-telegraph sender 50 of the Fig. 1 transmitting system.

If the radio-frequency signal transmitted from the Fig. 1 transmitting system to the Fig. 4 receiving system sustains a single signal-translation error in one of the check digits thereof, then no errors will ordinarily occur in the message digits associated therewith since, as explained previously, an error rate of one error approximately every 35 digits may be considered as a maximum rate. Under such operating conditions, the five signals developed by the odd-even pulse counters 87a–87e, inclusive, and stored in storage units 88a–88e, inclusive, respectively, uniquely represent that an error has occurred in a given check digit. The error-digit decoding network 89 develops a positive output potential indicating an erroneous digit in one of the 25 output circuits thereof when an error has occurred in a message digit but does not develop a positive output potential in any of the output circuits when an error has occurred in a check digit. Accoddingly, the 25 digit-modifying circuits of the error-digit corrector 90 then develop in the output circuits thereof signals representing the message digits translated without error notwithstanding the erroneous check digit. For some applications, the error-digit decoding network 89 may include 5 additional output circuits corresponding to check digits and the error-digit corrector 90 may include 5 additional digit-modifying circuits for correcting an erroneous check digit in a manner similar to that explained in connection with the correction of an erroneous message digit.

Figure 6:
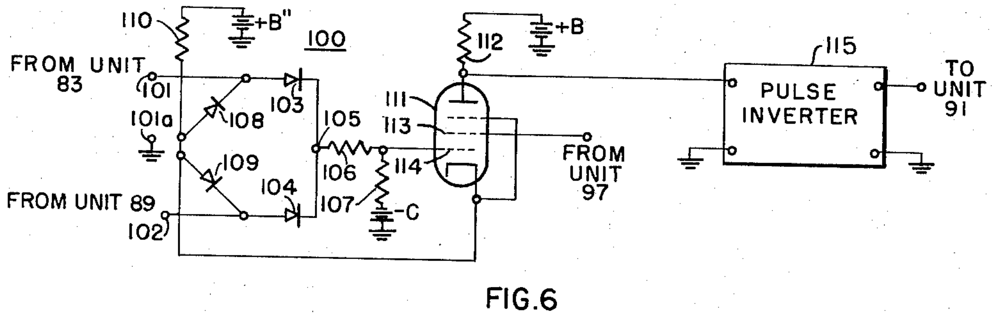
Fig. 6 is a circuit diagram of a portion of the Fig. 5 computer.

*Description of Fig. 6 digit-modifying circuit*

Referring now more particularly to Fig. 6, there is represented, in detail, one of the 25 digit-modifying circuits included in the Fig. 5 error-digit corrector 90. The digit-modifying circuit 100 has first and second pairs of input terminals 101, 101a and 102, 101a for connection to one of the storage units of the message-digit and check-digit register 83 of the Fig. 4 receiving system and to the corresponding output circuit of the error-digit decoding network 89 of the Fig. 5 error-correcting computer 84, respectively. The input terminals 101 and 102 are connected through suitable diode rectifiers 103, 104, respectively, comprising, for example, contact rectifiers, to a common terminal 105 of a voltage divider comprising resistors 106 and 107 series-connected to a suitable source of bias potential, represented as a battery −C. The input terminals 101 and 102 are also connected through diode rectifiers 108 and 109, respectively, and a resistor 110 to a source of positve potential, represented as a battery +B''.

The digit-modifying circuit 100 also includes a normally nonconductive tube 111 having a cathode connected to the resistor 110 and an anode coupled through a load resistor 112 to a source of positive potential, shown as a battery +B, and to a pulse inverter 115 of conventional construction, for connection to the Fig. 4 message-digit register 91. A first control electrode 114 of the tube 111 is connected to the junction of the resistors 106 and 107 for applying a control signal to the tube. The tube also includes a second control electrode 113 for connection to one of the trigger-pulse generators 97 of the Fig. 4 receiving system for applying a trigger pulse to the tube.

*Operation of Fig. 6 digit-modifying circuit*

The function of the digit-modifying circuit 100 is to determine whether the message digit applied to the circuit is erroneous and, if so, to correct the erroneous digit. The output signal of the tube 111 represents the corrected digit.

Assuming for the moment that a storage unit of the message-digit and check-digit register 83 of the Fig. 4 system applies to the input terminals 101, 101a, for example, a zero-potential signal representing a message-digit space which has not sustained signal-translation error, then the error-digit decoding network 89 maintains the terminal 102 at zero potential with respect to terminal 101a, representing that no error has occurred in the digit. Current then flows from the source +B'' through the resistor 110, and both diodes 108 and 109 to the zero-potential terminals 101 and 102, respectively, to maintain the cathode of the tube 111 at approximately zero potential. Likewise, diodes 103 and 104 conduct through the resistors 106 and 107 and the source −C to maintain the junction 105 at zero potential. The normally nonconductive tube 111 requires the coincident application of a positive trigger pulse to the control electrode 113 and a positive potential to the junction 105 to render the tube conductive for the duration of the trigger pulse. Accordingly, the junction of the resistors 106 and 107 is sufficiently negative under the assumed operating conditions to maintain the tube 111 nonconductive when a trigger pulse is applied to the control electrode 113 thereof. Hence, no output pulse is developed across the load resistor 112 for application to the input circuit of the message-digit register 91 of the Fig. 4 receiving system. The absence of an output pulse from the corrector 90 correctly represents the message-digit space applied to the digit-modifying circuit 100 and effectively translated therethrough without modification.

When the message-digit and check-digit register 83 of the Fig. 4 receiving system applies to the terminals 101, 101a of the digit-modifying circuit 100 a positive potential, representing a pulse which has not sustained signal-translation error, the error-digit decoding network 89 again maintains the input terminal 102 at zero potential representing that no error has occurred in the digit. The diode 109 then conducts, maintaining the cathode of the tube 111 approximately at zero potential while the diode 108 is nonconductive since the terminal 101 is at a positive potential. Current also flows through the diode 103, the resistors 106, 107 and the source −C raising the potential at the junction 105 approximately to the potential of the input terminal 101. Accordingly, the diode 104 is maintained nonconductive, since the terminal 102 is at a potential below the potential of the junction 105. The values of the resistors 106 and 107 are so proportioned that the control electrode 114 of the tube 111 assumes a potential sufficient to render the tube 111 conductive when a trigger pulse is applied to the control electrode 113 by one of the trigger-pulse generators 97. Accordingly, the digit-modifying circuit 100 then develops across the anode-load resistor 112 a negative output pulse which is inverted by the pulse inverter 115 and applied to the message-digit register 91 of the Fig. 4 receiving system, thereby effectively translating without modification the correct message-digit pulse applied to the input terminals 101, 101*a* thereof.

When the Fig. 4 register 83 applies an erroneous message digit to the digit-modifying circuit 100, the corresponding output circuit of the error-digit decoding network 89 of the Fig. 5 error-correcting computer applies to the input terminal 102 of the digit-modifying circuit 100 a positive potential representing that an error has occurred as explained previously. Assume that the message digit represented by the signal applied to the terminals 101, 101*a* by the message-digit and check-digit register 83 is erroneously represented by a zero-potential signal as a space. Accordingly, the terminal 101 is at zero potential while the terminal 102 is at a positive potential. Current then flows through the source +B″, the resistor 110, and the diode 108 to the terminal 101 to maintain the cathode of the tube 111 at approximately zero potential while the diode 109 is non-conductive. The diode 104 conducts through the resistors 106, 107, and the source −C to maintain the junction 105 approximately at the positive potential of the terminal 102. The diode 103 is nonconductive because of the positive potential at the junction 105 and zero potential at the terminal 101.

Since the junction 105 is at a positive potential, the tube 111 conducts when triggered by a pulse from one of the trigger-pulse generators 97 and develops an output pulse across the anode-load resistor 112 thereof. Accordingly, although the message-digit and check-digit register 83 applied to the error-digit modify circuit 100 an erroneous zero-potential signal representing a space, the tube 111 develops in the output circuit thereof an output pulse representing the translated message digit as a pulse. Thus, the digit-modifying circuit 100 corrects an erroneous message-digit space applied thereto changing the space to a pulse.

When the Fig. 4 message-digit and check-digit register 83 applies to the input terminals 101, 101*a* a positive potential representing an erroneous message-digit pulse, the Fig. 5 error-digit decoding network 89 applies to the terminal 102 a positive potential representing that an error has occurred. Current then flows through the source +B″, the resistor 110, and both diodes 108 and 109 to their respective input terminals 101, 102 maintaining the cathode of the tube 111 approximately at the positive potential of the terminals 101 and 102. Also, both diodes 103 and 104 conduct through resistors 106, 107 and the source −C maintaining the junction 105 at the potential of the input terminals 101 and 102. The control electrode of the tube 111 then is sufficiently negative to maintain the tube nonconductive when one of the trigger-pulse generators 97 applies a trigger pulse to the control electrode 113. Accordingly, no output pulse is developed across the anode-load resistor 112 by the digit-modifying circuit 100 for application to the storage unit of the message-digit register 91 of the Fig. 4 receiving system. Thus, the digit-modifying circuit effectively changes an erroneous message-digit pulse to a message-digit space, thereby correcting the signal-translation error.

Briefly summarizing the operation of the Fig. 6 digit-modifying circuit 100, when the input signals applied to the terminals 101, 101*a* and 102, 101*a* are the same, that is, both zero or both positive, the digit-modifying circuit does not develop an output pulse for application to the corresponding storage unit of the message-digit register 91 of the Fig. 4 receiving system. When the input signals applied to the terminals 101, 101*a* and 102, 101*a* differ, the digit-modifying circuit 100 applies a positive output pulse to the message-digit register 91 representing a message-digit pulse. Also, from the foregoing explanation, it will be seen that the digit-modifying circuit 100 effectively translates without modification a correct message digit while the circuit corrects an erroneous message digit.

Figure 7:
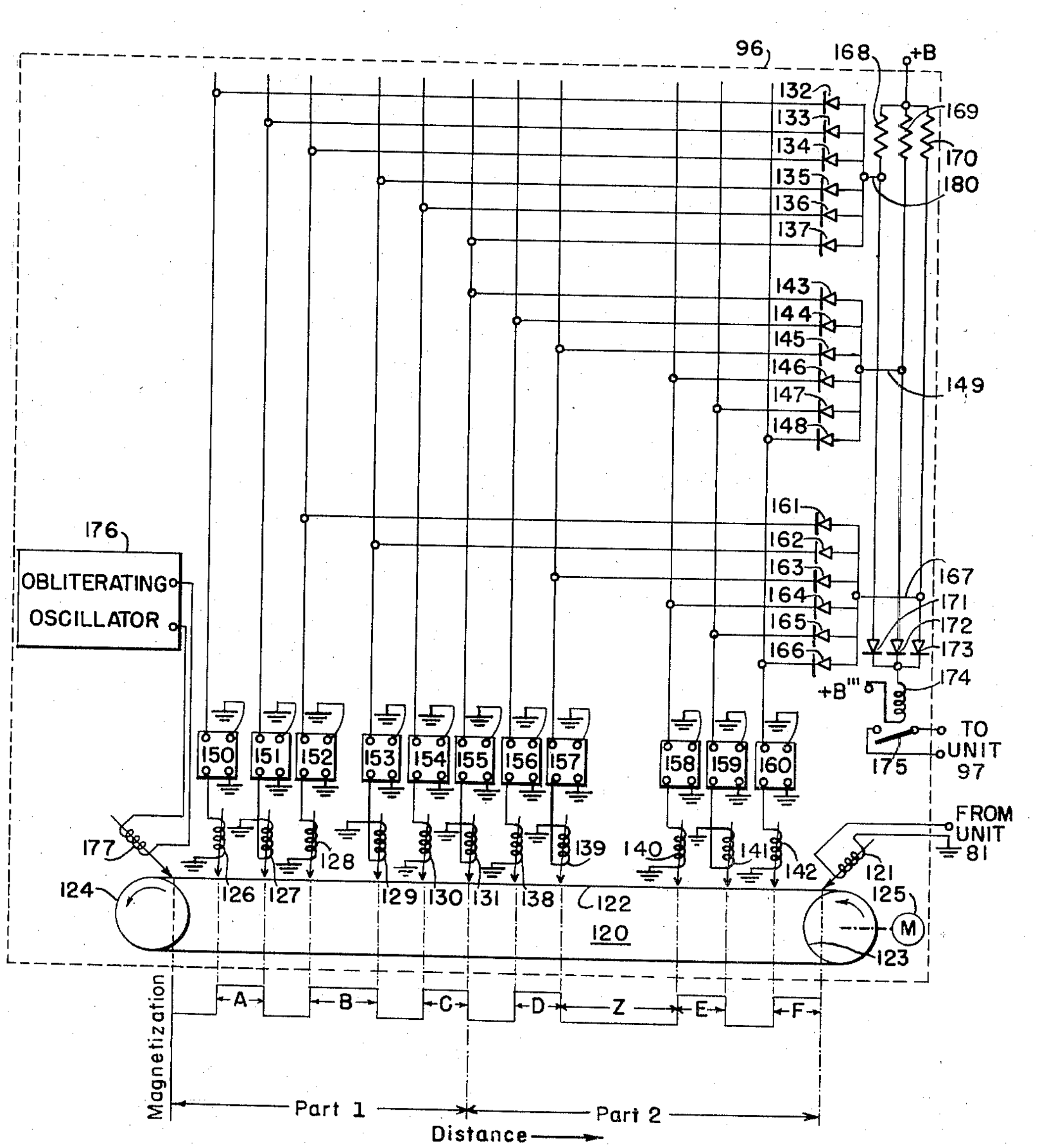
Fig. 7 is a circuit diagram, partly schematic, of a synchronizing-signal recognizer of the Fig. 4 equipment and includes a graph representing a magnetization-distribution characteristic of a portion of the synchronizing-signal recognizer.

*Description of Fig. 7 synchronizing-signal recognizer*

Referring now more particularly to Fig. 7 of the drawings, there is represented in detail the synchronizing-signal recognizer 96 of the Fig. 4 receiving system. The synchronizing-signal recognizer 96 preferably comprises pulse-storage means coupled to the supply circuit comprising the radio-frequency receiver 81 of the Fig. 4 receiving system for storing the synchronizing-pulse groups applied thereto by the receiver. More particularly, the pulse-storage means just mentioned comprises, for example, tape-recording means 120 of a conventional type including a recording head 121 coupled to the receiver 81 of the Fig. 4 system and a magnetic-tape roll 122 mounted on rotatable drive and guide wheels 123, 124, respectively, driven by a motor 125. The tape-recording means also includes a conventional obliterating oscillator 176 and obliterating head 177.

There preferably is also provided a pair of means individually responsive to the stored synchronizing-pulse groups for individually deriving control signals therefrom. This pair of means comprises, for example, a first group of pick-up heads 126–131, inclusive, responsive to the leading and trailing pulse edges of one of the stored synchronizing-pulse groups and a first group of normally conductive, unidirectionally conductive devices 132–137, inclusive, coupled to the pick-up devices 126–131, inclusive, respectively, and having a common terminal 180 for deriving a first control pulse from the aforesaid one synchronizing-pulse group. The pick-up heads 126–131, inclusive, may be of conventional construction for deriving a differentiated pulse from each leading and trailing synchronizing-pulse edge, such as, for example, described in an article entitled "Frequency-Modulated Magnetic-Tape Transient Recorder," by Harry B. Shaper, published in the November 1945 Proceedings of the I. R. E. The devices 132–137, inclusive, preferably comprise normally conductive contact diodes.

The pair of synchronizing-pulse-responsive means also comprises, for example, a second group of pick-up heads 131 and 138–142, inclusive, of similar construction to the first group of such heads 126–131, inclusive, and responsive to the leading and trailing pulse edges of the other of the stored synchronizing-pulse groups. The responsive means also includes a second group of normally conductive, unidirectionally conductive devices 143–148, inclusive, similar to the first group of such devices 132–137, inclusive, and coupled to the pick-up heads 131 and 138–142, inclusive, respectively, and having a common terminal 149 for deriving a second control pulse from the aforesaid other synchronizing-pulse group.

There preferably are coupled between the pick-up heads 126–131, inclusive, and 138–142, inclusive, and the diodes 132–137, inclusive, and 143–148, inclusive, respectively, several triggered-pulse generators 150–160, inclusive, individually responsive to output pulses supplied by the pick-up heads for developing positive-potential pulses of slightly longer duration. Each of the generators 150–160, inclusive, may, for example, comprise a triggered one-pulse multivibrator of the type described at page 9–18 of the above-mentioned "Electrical Engineers' Handbook."

The synchronizing-signal recognizer preferably also includes means responsive to predetermined pulses of the synchronizing-pulse groups for deriving a third control signal therefrom. More particularly, this means comprises, for example, the pick-up heads 128, 129, 139–142, inclusive, and normally conductive, unidirectionally conductive devices 161–166, inclusive, individually coupled thereto and having a common terminal 167.

The terminals 180, 149, and 167 preferably are coupled to a control circuit responsive to any of the above-mentioned control signals for effectively utilizing the same for triggering the pulse-storage means 82, 83, the error-correcting computer 84, the message-digit register 91, and the pulse-decoding means comprising the scanner 92 and the automatic-telegraph printer 95 of the Fig. 4 system. The control circuit preferably includes voltage-dropping resistors 168–170, inclusive, individually coupled to a suitable source of positive potential +B and to normally nonconductive contact diodes 171, 172, and 173, respectively. These diodes are individually connected to one terminal of a normally de-energized relay winding 174 having its other terminal connected to a source of positive bias potential +B''' for maintaining the diodes 171–173, inclusive, non-conductive. A normally open relay contact 175 is associated with the relay winding 174. The relay contact 175 is coupled to the input circuit of one of the trigger-pulse generators 97 of the Fig. 4 receiving system.

*Operation of Fig. 7 synchronizing-signal recognizer*

Considering now the operation of the synchronizing-signal recognizer 96 of the of the Fig. 4 receiving system, the radio-frequency receiver 81 applies the modulation components of a received synchronizing signal through the relay contact 83*b* to the synchronizing-signal recognizer 96. More particularly, as represented in Fig. 7, the receiver applies the synchronizing signal to the recording head 121 of the tape-recording means 120. The recording head 121 records the synchronizing signal on the magnetic tape 122 as magnetization variations as the tape passes under the recording head in a conventional manner. When the 12 pulses and spaces of the 14-digit synchronizing signal have been recorded on the tape 122, in the absence of noise interference with the received synchronizing signal the tape has a magnetization-distribution characteristic as indicated by the graph of Fig. 7.

The magnetization-distribution characteristic represented by the Fig. 7 graph corresponds to the modulation components of the received radio-frequency synchronizing signal. The leading and trailing edges of the magnetization pulses of the tape 122 simultaneously pass under individual ones of the pick-up heads 126–131, inclusive, and 138–142, inclusive, as indicated in Fig. 7. The pick-up heads effectively transform by differentiation in a usual manner the leading and trailing edges of the synchronizing pulses represented by the magnetization pulses to positive-potential pulses of short duration and occurring substantially simultaneously. To this end, the even-numbered pick-up heads and the odd-numbered pick-up heads are individually connected with opposite polarities to the generators 150–160, inclusive, so that the even-numbered pick-up heads develop positive-potential pulses in response to leading synchronizing-pulse edges while the odd-numbered pick-up heads develop positive-potential pulses in response to trailing synchronizing-pulse edges. These positive-potential pulses are simultaneously applied to the triggered-pulse generators 150–160, inclusive, which individually develop positive-potential pulses of slightly longer duration for tolerance purposes to ensure simultaneity of at least portions thereof notwithstanding any small differences which may occur in the timing of the pulses derived by the pick-up heads.

The output pulses of the triggered-pulse generators 150–160, inclusive, simultaneously render nonconductive the normally conductive diodes 132–137, inclusive, 143–148, inclusive, and 161–166, inclusive. When all of the diodes of any one of the groups just mentioned are nonconductive, the potential at the corresponding one of the junctions 180, 149, and 167 rises sufficiently to render conductive the corresponding one of the diodes 171–173, inclusive. Accordingly, because all the diodes 132–137, inclusive, 143–148, inclusive, and 161–166, inclusive, are rendered nonconductive under the described operating conditions, the potential at each of the junctions 180, 149, and 167 rises, rendering conductive the normally nonconductive diodes 171, 172, and 173. The current flow through any of the three diodes 171–173, inclusive, is sufficient to energize the normally de-energized relay winding 174, thereby closing the normally opened relay contact 175 to trigger the triggered-pulse generators 97 and cause the application of the following 30 message-code and check-code digits to the shifting register 82 of the Fig. 4 receiving system in the manner explained previously.

As the magnetic tape 122 passes under the obliterating head 177, the signal thereon is obliterated in a conventional manner to ready the tape for subsequent use.

In the event that noise interference with the received signal during the transmission thereof from the Fig. 1 transmitting system to the Fig. 4 receiving system causes the distortion or effective loss of one synchronizing digit of the 14-digit group by, for example, changing the digit from a pulse to a space or vice versa, one part of the synchronizing signal will then be ineffective to cause synchronization. For example, assume that noise changes pulse A from a pulse to a space. The pick-up devices 126 and 127 then are ineffective to supply positive-potential pulses to the triggered-pulse generators 150 and 151 at the time that the other pick-up heads supply such pulses to their corresponding generators. Accordingly, diodes 132 and 133 remain conductive while the other diodes 134–137, inclusive, 143–148, inclusive, and 161–166, inclusive, are rendered nonconductive. In order for the potential at the junction 180 to rise sufficiently to render conductive the diode 171 all of the diodes 132–137, inclusive, must conduct. The diode 171 therefore remains nonconductive. The potentials at junctions 149 and 167, however, rise sufficiently to render conductive the diodes 172 and 173 and cause energization of the relay winding 174, thereby effecting synchronization.

Assume now that noise changes pulse C from a pulse to a space, thereby introducing error into both parts of the synchronizing signal. The pick-up devices 130 and 131 then are ineffective to trigger the generators 154 and 155 at the proper time. The diodes 136, 137, and 143 remain conductive and the potential at each of the junctions 180 and 149 does not rise sufficiently to render conductive the diodes 171 and 172. The combination of pick-up devices 128, 129, and 139–142, inclusive, however, is rendered nonconductive in its entirety, causing the potential at junction 167 to rise sufficiently to render conductive the diode 173 and energize the relay winding 174 to effect synchronization.

From the foregoing examples, it will be seen that no loss of synchronization occurs notwithstanding one error in any of the synchronizing-pulse groups or several errors in the same synchronizing-pulse group. Since the synchronizing-pulse groups are distinguishable from each other, the pick-up heads 126–131, inclusive, of the first group are simultaneously responsive only to the first part of the synchronizing signal and the pick-up heads 131 and 138–142, inclusive, of the second group are simultaneously responsive only to the second part of the synchronizing signal. Similarly, pick-up devices 128, 129, and 139–142, inclusive, of the combination group are simultaneously responsive only to a predetermined combination of portions of the first and second synchronizing-signal parts. Further, since each of the synchronizing-pulse groups includes a nonintegral digit, for example, digits B ad Z of 1½ digit and 2½ digit duration, respectively, noise which alters one-half to one digit of succeeding message-code and check-code digits will ordinarily be ineffective to cause the message-code pulse groups to assume the same pulse formation as either part of the synchronizing signal. Also, noise ordinarily is ineffective to alter one part of the synchronizing signal in such manner as to cause that part to assume the same pulse formation as the other part. Thus, the likelihood of loss of synchronization or improper synchronization is small.

From the foregoing description, it will be apparent that a self-correcting pulse-code-communication system constructed in accordance with the invention has several advantages. In the first place, the system has the advantage of translating message-code pulses representative of discrete message symbols and reproducing the symbols subject to reduced error. The system also has the advantage of translating message-code pulse groups individually representative of discrete message symbols and utilizing a minimum number of check-code pulses for checking a predetermined plurality of the message-code pulse groups for signal-translation error. Further, the system has the advantage of being adapted for use in privacy or secrecy systems since it utilizes a 5-digit check-code pulse group for checking 5-digit message-code pulse groups for signal-translation error. The system has the additional important advantage that the message-code and check-code pulse groups may be synchronized by a single synchronizing signal which is capable of effecting synchronization notwithstanding one digital error therein. The system also has the advantage that it is capable of operating in conjunction with conventional automatic-telegraph sending and printing equipment.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pulse-code-transmitting system for transmitting a signal representing message-code pulses representative of discrete message symbols and check-code pulses for checking said signal for signal-translation error comprising: first pulse-coding means for developing plural-digit message-code pulse groups individually representative of said symbols; pulse-storage means responsive to said pulse-coding means for storing a predetermined plurality of said groups; and second pulse-coding means responsive jointly to predetermined digital combinations of said predetermined plurality of message-code groups for developing a check-code pulse group of minimum redundancy and uniquely representative of the odd-even sum values of said combinations in said plurality of message-code groups; and means coupling said pulse-storage means to said second pulse-coding means for so determining said digital combinations that each message digit is included in a unique permutation of said combinations and that said check-code pulse group is capable of indicating which is the erroneous digit when a single signal-translation error occurs in the message and check digits.

2. A pulse-code-transmitting system for transmitting a signal representing binary-permutation-code message pulses representative of discrete message symbols and binary-permutation-code check pulses for checking said signal for signal-translation error comprising: first pulse-coding means for developing plural-digit binary-permutation-code message-pulse groups individually representative of said symbols; pulse-storage means responsive to said pulse-coding means for storing a predetermined plurality of said groups; and second pulse-coding means responsive jointly to predetermined digital combinations of said predetermined plurality of message-pulse groups for developing a binary-permutation-code check-pulse group of minimum redundancy and uniquely representative of the odd-even sum values of said combinations in said plurality of message-pulse groups; and means coupling said pulse-storage means to said second pulse-coding means for so determining said digital combinations that each message digit is included in a unique permutation of said combinations and that said check-code pulse group is capable of indicating which is the erroneous digit when a single signal-translation error occurs in the message and check digits.

3. A pulse-code-transmitting system for transmitting a signal representing message-code pulses representative of discrete message symbols and check-code pulses for checking said signal for signal-translation error comprising: first pulse-coding means for developing 5-digit message-code pulse groups individually representative of said symbols; pulse-storage means responsive to said pulse-coding means for storing 5 of said groups; and second pulse-coding means responsive jointly to said 5 message-code groups for developing a check-code pulse group of exactly 5 digits uniquely representative of predetermined digital relations in said 5 message-code groups; and means coupling said pulse-storage means to said second pulse-coding means for so determining said digital relations that each message digit is included in a unique permutation of said combinations and that said check-code pulse group is capable of indicating which is the erroneous digit when a single signal-translation error occurs in the message and check digits.

4. A pulse-code-transmitting system for transmitting a signal representing message-code pulses representative of discrete message symbols and check-code pulses for checking said signal for signal-translation error comprising: first pulse-coding means for developing plural-digit message-code pulse groups individually representative of said symbols; pulse-storage means responsive to said pulse-coding means for storing a predetermined plurality of said groups; and second pulse-coding means comprising message-digit scanners and odd-even pulse counters individually coupled to said scanners and responsive individually to predetermined digital combinations of said predetermined plurality of message-code groups for developing control signals individually and uniquely representative of the odd-even sum values of message pulses in said combinations, said second pulse-coding means being responsive to said control signals for developing check-code pulses of minimum redundancy and individually and uniquely representative of said odd-even sum values; and means coupling said pulse-storage means to said message-digit scanners for so determining said predetermined digital combinations that each message digit is included in a unique permutation of said combinations and that said check-code group is capable of indicating which is the erroneous digit when a single signal-translation error occurs in the message and check digits.

5. A pulse-code-transmitting system for transmitting a signal representing message-code pulses representative of discrete message symbols and check-code pulses for checking said signal for signal-translation error comprising: first pulse-coding means for developing plural-digit message-code electrical pulse groups individually representative of said symbols; first pulse-storage circuit means coupled to said pulse-coding means for storing a predetermined plurality of said groups; control-signal-coding means responsive jointly to predetermined digital combinations of said predetermined plurality of message-code groups for developing a check-code control-signal group of minimum redundancy and uniquely representative of the odd-even sum values of said combinations in said plurality of message-code groups; means coupling said first pulse-storage means to said control-signal coding means for so determining said digital combinations that each message digit is included in a unique permutation of said combinations and that said check-code pulse group is capable of indicating which is the erroneous digit when a single signal-translation error occurs in the message and check digits; second pulse-storage circuit means coupled to said control-signal-coding means for storing said check-code group and coupled to said first pulse-storage means for storing said plurality of message-code groups; and a message-digit and check-digit scanner coupled to said second pulse-storage means for deriving therefrom successive message and check pulses for transmission in a predetermined order.

6. A pulse-code-transmitting system for transmitting a signal representing message-code pulses representative of discrete message symbols and check-code pulses for checking said signal for signal-translation error comprising: first pulse-coding means for developing 5-digit message-code pulse groups individually representative of said symbols; and second pulse-coding means responsive jointly to predetermined digital combinations of a predetermined plurality of 5-digit message-code groups for developing a check-code pulse group of exactly 5 digits uniquely representative of the odd-even sum values of said combinations in said plurality of message-code groups; and means for so determining said digital combinations that each message digit is included in a unique permutation of said combinations and that said check-code pulse group is capable of indicating which is the erroneous digit when a single signal-translation error occurs in the message and check digits.

7. A pulse-code-transmitting system for transmitting a signal representing message-code pulses representative of discrete message symbols and check-code pulses for checking the signal for signal-translation error comprising: first pulse-coding means for developing plural-digit message-code pulse groups individually representative of said symbols; and second pulse-coding means responsive jointly to predetermined digital combinations of a predetermined plurality of said message-code groups for developing a check-code pulse group of minimum redundancy and uniquely representative of the odd-even sum values of said combinations in said plurality of message-code groups; and means for so determining said digital combinations that each message digit is included in a unique permutation of said combinations and that said check-code pulse group is capable of indicating which is the erroneous digit when a single signal-translation error occurs in the message and check digits.

References Cited in the file of this patent

UNITED STATES PATENTS

| | | |
|---|---|---|
| Re. 22,394 | Moore et al. | Nov. 23, 1943 |
| 1,332,976 | Dowd | Mar. 9, 1920 |
| 1,810,107 | Kleinschmidt | June 16, 1931 |
| 1,864,074 | Krum | June 21, 1932 |
| 2,552,629 | Hamming et al. | May 14, 1951 |
| 2,557,964 | Herbst | June 26, 1951 |
| 2,570,279 | Ridler et al. | Oct. 9, 1951 |
| 2,596,199 | Bennett | May 13, 1952 |
| 2,653,996 | Wright | Sept. 29, 1953 |
| 2,689,950 | Bayliss et al. | Sept. 21, 1954 |
| 2,706,215 | Van Duuren | Apr. 12, 1955 |